United States Patent [19]

Beck et al.

[11] Patent Number: 4,741,971

[45] Date of Patent: May 3, 1988

[54] METHOD FOR IMPARTING FLAME RESISTANCE TO WOOD SURFACES

[75] Inventors: H. Nelson Beck, Walnut Creek; Dalton C. MacWilliams, Alamo, both of Calif.

[73] Assignee: The Dow Chemical Company, Midland, Mich.

[21] Appl. No.: 866,540

[22] Filed: May 23, 1986

[51] Int. Cl.[4] .............................................. B32B 21/04

[52] U.S. Cl. ................................ 428/537.1; 428/541; 428/921; 427/297; 427/393; 427/393.3; 427/440; 106/18.16; 106/18.17

[58] Field of Search ..................... 428/541, 921, 537.1, 428/704; 427/297, 440, 393.3, 393; 106/18.16, 18.17; 423/302, 300

[56] References Cited

U.S. PATENT DOCUMENTS

| | | | |
|---|---|---|---|
| 3,160,515 | 12/1964 | Goldstein et al. | 428/541 |
| 3,342,629 | 9/1967 | Martin | 428/541 |
| 3,501,339 | 3/1970 | Gurgiolo | 428/541 |
| 4,044,104 | 8/1977 | Cremer et al. | 423/302 |
| 4,182,794 | 1/1980 | Smith et al. | 428/704 |
| 4,276,343 | 6/1981 | Cremer et al. | 428/921 |

*Primary Examiner*—Edith Buffalow

[57] ABSTRACT

Methods for impregnating the pores of at least partially dried wood with a phosphorus nitride, particularly $P_3N_5$, to provide flame resistance are described. Preferably liquid slurries of the phosphorus nitride are impregnated into the exposed pores of the wood using pressure or preferably a partial vacuum in a confined space which removes air from the pores and allows the slurry to impregnate the wood. The liquid is then removed from the wood.

20 Claims, No Drawings

METHOD FOR IMPARTING FLAME RESISTANCE TO WOOD SURFACES

BACKGROUND OF THE INVENTION (1) Field of the Invention

The present invention relates to a method wherein phosphorus nitrides are impregnated into the exposed surface pores of wood in order to impart flame resistance. In particular the present invention relates to the impregnation of the wood pores with a crystalline phosphorus nitride having the formula $P_3N_5$.

(2) Prior Art

The closest prior art is believed to be disclosed in U.S. Pat. No. 4,044,104 (1977) to Cremer et al. This patent describes the preparation of non-aggregating, particulate phosphorus nitrides of the formula $PN_x$ where x is a number between 0.9 and 1.7. In particular this reference describes crystalline $P_3N_5$ (PN 1.67). The phosphorus nitrides are prepared by elevated temperature heating of phosphorus nitrides, formed by reacting ammonia and a phosphorus halide at relatively low temperatures, in stages in an inert gas to yield low or high density (crystalline) phosphorus nitrides. There are numerous other references describing the preparation of phosphorus nitrides, particularly $P_3N_5$.

The Cremer et al patent describes the use of the low density products in "cellulose" and suggests that the compound is useful for imparting flame retardant properties to textile materials. It is believed that the reference to "cellulose" as used in this patent relates to cellulose derived polymer fibers where the phosphorus nitride is blended into a melt prior to spinning the fibers. There would be relatively substantial amounts of the phosphorus nitrides per unit volume or weight of the fibers. In any event, there is no indication in this patent that the phosphorus nitrides are impregnated into an exposed surface in relatively small amounts per unit volume or weight.

German Offenlegungschrift No. 2,311,180 (1974) (CA82:59676W) describes regenerated cellulose fibers containing ten percent (10%) by weight of $P_3N_5$ which are flame retardant. In this instance the whole fiber contains a relatively large amount of the $P_3N_5$. There is no suggestion of surface treatment of the cellulose fibers.

German Offenlegungschrift No. 2,440,074 (1976) (CA85:7219s) describes the use of five percent (5%) by weight of $P_3N_5$ in regenerated cellulose fibers to provide flame resistance. Again this use requires a relatively high level of the phosphorus nitride.

It has not occurred to those skilled in the art that a very small amount of the phosphorus nitrides per unit volume or weight of an article could be used to provide flame resistance by impregnating only a surface or surfaces of a porous substrate in order to provide flame resistance. In particular, there has been no suggestion by the prior art that wood might be treated in this manner.

OBJECTS

It is therefore an object of the present invention to provide a treated wood which has only its exposed surfaces impregnated with a phosphorus nitride in order to provide flame resistance, thus requiring impregnation of only a very small amount of phosphorus nitride relative to the volume or weight of the wood. Further it is an object of the present invention to provide a method for impregnating the wood to provide the treated wood which is simple and economical. These and other objects will become apparent to those skilled in the art by reference to the following description.

GENERAL DESCRIPTION

The present invention relates to a method of imparting surface flame resistance to wood which comprises: providing at least partially dried wood which has pores in an exposed surface; and impregnating the pores in the surface of the dried wood with finely divided particles of a phosphorus nitride to form a treated wood.

The present invention also relates to an improved wood product which exhibits surface flame resistance which comprises: an at least partially dried wood which has pores in an exposed surface; and a finely divided phosphorus nitride in the pores in the surface of the wood.

The wood surface which is impregnated by the method of the present invention can be in the form of solid wood, cardboard, particle board, chipboard, pressboard or a reconstituted wood fiber product. The wood can also be in the form of plywood with multiple layers. All that is necessary is that there be a wood surface which is exposed for impregnation by the phosphorus nitride. As used herein the term "wood" means any solid wood or wood containing product which has the necessary porosity for impregnation with the phosphorus nitride.

The exposed surface of the wood must be at least partially dried so that there are open pores in the exposed surface. The woods can be soft or hard and of any species. There are numerous publications describing the pore characteristics of various species of wood and a discussion can be found in Kirk-Othmer Volume 24, pages 579 to 611 (1984). Page 585 shows the relative permeability of woods to flow of liquids under pressure. Usually soft woods, particularly coniferous woods, have pores which are more readily impregnated by the method of the present invention than hard woods. Cedar is an example of a wood which has poor permeability even though it is relatively soft. Also coniferous woods contain natural resins which can aid in holding the particles of impregnated phosphorus nitride in the pores.

The drying of the wood is by conventional means. Freshly cut wood contains 47 to 50% by weight moisture depending upon the species and growing conditions. Air dried wood contains about 20% by weight moisture and kiln dried wood contains about 6% by weight moisture. It will be appreciated that the percent moisture removed from the wood is not important so long as there are exposed pores in the surface of the wood. Preferably the percent moisture is between 0 and 30% by weight for the purpose of the present invention.

The wood can have any convenient form or shape so long as it can be impregnated by the phosphorus nitride. A preferred form for impregnation by the method of the present invention is siding or roofing shingles which are usually composed of solid wood. The treatment of cedar siding and shingles is especially preferred. It is also preferred to impregnate at least the outer plies or layers of plywood sheets which can be made of various species of wood depending upon the application.

The flammability of the treated wood product is tested by the Limiting Oxygen Index (LOI) method (ASTM D2863-70). This method measures flammability as function of the percentage of oxygen in nitrogen to which the wood is exposed as a flame is applied to a surface compared to the amount of oxygen in air (21% $O_2$). It will be appreciated that only the treated surface(s) of the wood is exposed to the test since untreated surfaces would have normal flammability. The method of the present invention is able to significantly increase the LOI of the treated wood as a result of impregnating it with phosphorus nitride. Thus a twenty percent (20%) increase in LOI can be achieved where all of the exposed surfaces of the wood are impregnated with phosphorus nitride. Preferably the LOI is greater than about twenty-five percent (25%) oxygen for the treated wood surfaces.

The phosphorous nitride has the formula $PN_x$ where x is a number between 0.9 and 1.7 as described in U.S. Pat. No. 4,044,104 to Cremer et al. The phosphorus nitrides can be amorphous or crystalline depending upon whether or not they are subjected to a low or high temperature treatment. Crystalline phosphorus nitride which is generally assigned the formula $P_3N_5$ ($PN_{167}$) is formed at high temperature and is preferred. The crystalline form is preferred because of commercial availability; however, the lower temperature phosphorus nitrides can be used. The phosphorus nitrides are not water soluble and thus are well suited for outdoor uses.

The phosphorus nitrides preferably have no particles of a size greater than about 80 mesh as measured by ASTM E276-68. Most preferably the mesh size of the particles is between about 100 and 400 mesh. The particles can be of uniform sizes or have a mesh size distribution.

The impregnating of the wood can be accomplished by any convenient method. It is possible to spray the particles at a velocity sufficient to impregnate the wood; however, this is not preferred because of the potential for damage to the surface of the wood. It is preferred to impregnate the pores of wood using a liquid slurry of the phosphorus nitride. The slurry can be absorbed in the wood as a result of merely coating the surface of the wood; however, this treatment tends to lack uniformity across the treated surface. It is preferred (1) to pressurize the slurry into the wood or (2) to evacuate air from the pores of the wood with a partial vacuum which removes air from the wood so that the particles are impregnated into the pores at least partially when the vacuum is released.

Where elevated pressures are used, these can be between about $8\times10^3$ and $4\times10^5$ Torr. Where a vacuum is used for the impregnation, the wood can be coated with the phosphorus nitride and provided in a confined space. A partial vacuum is applied to withdraw air from the wood. Upon release of the vacuum, the slurry is driven into the pores of the wood. Alternatively the wood can be immersed in the slurry in a confined space and then the vacuum applied to remove air from the pores and impregnate the wood in the same manner. Vacuums between about 200 and 760 Torr can be used. The vacuum impregnation step is preferred because of the greater certainty of uniform impregnation. The liquid can then be removed from the pores after impregnation by any convenient method such as by using an absorbent or adsorbent; however, simple drying is the easiest and most preferred step.

For ease of handling, preferably the slurry contains between about 5 and 60% by weight of the phosphorus nitride in the liquid. Generally the smaller the particle size, the more water is necessary to form a usable slurry.

Water is the most convenient and inexpensive liquid; however other liquids can be used particularly liquids which tend to secure the particles in the pores such as conventional flame proofing compounds, mold inhibiting compounds (creosotes) or resinous or polymeric sealing liquids. All of these variations will be obvious to those skilled in the art.

SPECIFIC DESCRIPTION

Example 1

Phosphorus (V) nitride, $P_3N_5$, (not larger than 200 mesh, Alpha Division of Ventron Corp. located at Danvers, Mass. 01923), 1.0 g., was dispersed with magnetic stirrring in 500 ml deionized water in a 1 liter capacity round bottom flask equipped with an 8 inch glass column and closed by a stopcook and connected to a vacuum pump. Several cedar wood splints (5–10 mm$\times$8–10 mm$\times$70–100 mm) were placed in the slurry. The air space was evacuated to a vacuum of about 3 to 4 mm Hg (3 to 4 Torr) until air bubbles were no longer noticed leaving the wood and until the stirred slurry became cool to touch due to evaporation of water (about 10 minutes). The vacuum source was then removed, and the air pressure in the flask was allowed to return to one atmosphere (760 mm of mercury or 1 Torr). This procedure had the effect of removing air from the voids and pores in the wood followed by impregnation of solid $P_3N_5$ into the pores of the wood upon release of the vacuum. The splints were dried at 80° C. for 8 hours in an air circulating oven. It was found that untreated wood had a Limiting Oxygen Index (LOI) value of 21% oxygen when tested according to ASTM Designation D2863-70, whereas the $P_3N_5$ treated wood had an LOI value of 25 to 26% oxygen.

Veneer may be treated in the same manner as the splints to provide flame retardance. Other wood products can be treated in the same manner.

Using $P_3N_5$ with a mesh size of 200 or smaller, a viscous paste is formed in an aqueous mixture of 25 weight percent $P_3N_5$. A usable slurry is obtained at about 20 weight percent of the $P_3N_5$ or less in the aqueous slurry. Example 1 shows that a very low amount of the $P_3N_5$ can be used in the slurry.

It is believed that those skilled in the art will be able to easily repeat Example 1 with other wood products, phosphorus nitrides, particle sizes, slurries, and pressures and that these variations will be obvious to those skilled in the art based upon the present specification.

We claim:

1. A method of imparting surface flame resistance to wood which comprises:
   (a) providing at least partially dried wood which has pores in an exposed surface; and
   (b) impregnating the pores in the surface of the dried wood with finely divided particles of a phosphorus nitride to form a treated wood.

2. The method of claim 1 wherein the phosphorus nitride has an empirical formula $PN_x$ where x is a number between 0.9 to 1.7 and includes no particles of a size greater than about 80 mesh as measured by ASTM E 276-68.

3. The method of claim 1 wherein the impregnating is with a slurry of the phosphorus nitride in a liquid, the slurry enters the pores in the wood, and the liquid is removed from the wood leaving the phosphorus nitride in the pores.

4. The method of claim 3 wherein the liquid is water which is removed by drying the surface of the treated wood.

5. The method of claim 3 wherein the slurry is impregnated into the wood by immersing the wood in the slurry, then providing the immersed wood in a confined space and then producing a partial vacuum in the confined space such that air is removed from the pores of the wood and replaced by the slurry upon release of the vacuum.

6. The method of claim 3 wherein the impregnating is by coating the surface of the wood with the slurry, then placing the coated wood in a confined space and then producing a partial vacuum in the confined space such that air is removed from the pores of the wood which on vacuum release is replaced by the slurry.

7. The method of claim 3 wherein the impregnating is by immersing the wood in the slurry or coating the wood with the slurry which contains water as the liquid and the phosphorus nitride having an empirical formula $P_3N_5$ in a confined space and then producing a vacuum in the confined space to remove the air from wood which on vacuum release is replaced by the slurry.

8. The method of claim 1 wherein the phosphorus nitride has an empirical formula $P_3N_5$.

9. The method of claim 1 wherein the impregnating is by pressurizing a liquid and the phosphorus nitride as a slurry into the surface of the wood.

10. The method of claim 3 wherein the phosphorus nitride is admixed with the liquid in an amount such as to constitute from about 5 and about 60 percent by weight of the slurry.

11. An improved wood product which exhibits surface flame resistance which comprises:

(a) an at least partially dried wood which has pores in an exposed surface; and (b) a finely divided phosphorus nitride in the pores in the surface of the wood.

12. The product of claim 11 wherein the finely divided phosphorus nitride has an empirical formula $PN_x$ wherein x is a number between 0.9 to 1.7 and includes no particles of a size greater than about 80 mesh as measured by ASTM E276-68.

13. The product of claim 11 wherein the wood contains between about 0 and 30 percent moisture retained from growth of the wood.

14. The product of claim 11 wherein the wood is cedar.

15. The product of claim 11 wherein the wood is in the form of wooden roofing shingles.

16. The product of claim 11 wherein the wood is in the form of wooden siding shingles.

17. The product of claim 11 wherein the phosphorus nitride has an empirical formula $P_3N_5$.

18. The product of claim 11 wherein the surface of the wood has a Limiting Oxygen Index of above about 25 percent oxygen as measured by ASTM D2863-70.

19. The product of claim 11 wherein the product is in the form of plywood, having multiple layers, two of which are exposed and wherein at least the exposed layers of the plywood have pores impregnated with phosphorus nitride.

20. The product of claim 11 wherein the wood product is selected from particle board, chipboard and fiberboard.

* * * * *

UNITED STATES PATENT AND TRADEMARK OFFICE

CERTIFICATE OF CORRECTION

PATENT NO. : 4,741,971

DATED : May 3, 1988

INVENTOR(S) : H. Nelson Beck; Dalton C. MacWilliams

It is certified that error appears in the above-identified patent and that said Letters Patent is hereby corrected as shown below:

Col. 3, line 21, delete "$(PN_{167})$" and insert -- $(PN_{1.67})$ --;

Col. 4, line 15, "stirring" has been misspelled.

Signed and Sealed this

Twentieth Day of December, 1988

*Attest:*

DONALD J. QUIGG

*Attesting Officer* *Commissioner of Patents and Trademarks*